United States Patent [19]

Mitsushima et al.

[11] Patent Number: 4,845,514

[45] Date of Patent: Jul. 4, 1989

[54] THERMAL TRANSFER TYPE LINE PRINTER CAPABLE OF SETTING PRINTING DENSITY BY COMMAND SUPPLIED FROM AN EXTERNAL DEVICE

[75] Inventors: Susumu Mitsushima; Junji Kawano; Satoshi Iwata, all of Ise, Japan

[73] Assignee: Shinko Electric Co., Ltd., Tokyo, Japan

[21] Appl. No.: 95,048

[22] Filed: Sep. 10, 1987

[30] Foreign Application Priority Data

Sep. 19, 1986 [JP] Japan ............................... 61-221066
Oct. 9, 1986 [JP] Japan ............................... 61-240263

[51] Int. Cl.[4] ............................................ G01D 15/10
[52] U.S. Cl. ............................... 346/76 PH; 400/120
[58] Field of Search ................ 346/76 PH, 1.1, 76 R; 400/120

[56] References Cited

FOREIGN PATENT DOCUMENTS 0241165 10/1986 Japan .................................. 400/120

*Primary Examiner*—E. A. Goldberg
*Assistant Examiner*—H. Tran
*Attorney, Agent, or Firm*—Hoffmann & Baron

[57] ABSTRACT

A thermal transfer type printer prints a desirable dot pattern on a printing paper by heating heating cells within a thermal head which is pressed against the printing paper via a transfer ribbon, the surface of which is painted by thermal melting ink. A memory stores two kinds of current-on time data, each of which represent specific current-on time characteristics designating a relation between the current-on time and a surrounding temperature of the thermal head. This surrounding temperature is detected by a thermistor mounted on the thermal head. One of two current-on time characteristics can be arbitrarily selected, and desirable current-on time is read from the selected current-on time characteristics based on the detected surrounding temperature. Some heating cells are selected in accordance with the desirable dot pattern and the selected heating cells are heated for the desirable current-on time. In addition, the current-on time can be arbitrarily set longer or shorter by increasing or decreasing the value of the current-on time data, whereby the printing density can be arbitrarily varied.

15 Claims, 6 Drawing Sheets

THERMAL TRANSFER TYPE LINE PRINTER CAPABLE OF SETTING PRINTING DENSITY BY COMMAND SUPPLIED FROM AN EXTERNAL DEVICE

BACKGROUND OF THE INVENTION

1. Field of the Invention

The present invention generally relates to thermal transfer type printers, and more particularly to a thermal transfer type printer capable of varying a printing density thereof based on printing data which select desirable printing density.

2. Prior Art

Conventionally, a thermal transfer type printer prints bar codes, characters and graphics on a printing paper by use of a transfer ribbon and a line thermal head in which a plurality of heating cells are disposed in one line (hereinafter, referred to as a thermal head). More specifically, thermal melting ink is painted on a surface of the transfer ribbon so that an ink layer is formed on the surface of the transfer ribbon, and this ink layer of the transfer ribbon is pressed against the printing paper. The thermal head is pressed against the backside of the transfer ribbon and heated so as to melt the thermal melting ink of the ink layer in response to a desirable pattern. Such melted ink is transferred on the printing paper. Thus, the desirable pattern is printed on the printing paper. Other than this thermal transfer type printer, a thermosensible type printer is also well known. In such thermosensible type printer, a printing pattern is directly given to a thermosensible paper so that the printing pattern is printed on the thermosensible paper.

In the above-mentioned printers, the printing density is generally set to a predetermined fixed density by use of a volume and a switch. In some thermal transfer type printers, a density control circuit is provided for maintaining a high printing quality. More specifically, the density control circuit controls the heating temperature of the thermal head based on the present temperature of the thermal head detected by a thermistor so that the printing density is maintained at the predetermined fixed density. In addition, this density control circuit provides a memory (e.g., ROM) therein, which is written by data concerning a current-on time (i.e., a period for supplying current to the thermal head). As shown in FIG. 1, these current-on times are estimated from current-on characteristics (shown as a curve for supplied energy) which determine a value of a current supplied to the thermal head. The respective data of the current-on times obtained from the above curve (shown in FIG. 1) will be shown in the following Table 1 (shown in the next page).

TABLE 1

| Temp. (Degree Centigrade) | Value of Temp. Data from D/A Converter 9 | Current-On Time (milli second) |
|---|---|---|
| 60 | 1 | 0.51 |
| ⋮ | 2 | 0.52 |
| ⋮ | 3 | 0.53 |
| ⋮ | 4 | 0.54 |
| ⋮ | 5 ⋮ | 0.55 ⋮ |
| ⋮ | 252 | 2.99 |
| 0 | 253 | 3.00 |

Based on such data of current-on times, a period for supplying the current to the thermal head is determined. For example, in the case where a printing operation must be stopped immediately after a power switch of a printer is turned on accidentally, the current-on time is set relatively longer because an initial temperature of the thermal head is relatively low. When the initial temperature of the thermal head is set at 0 degree centigrade, it is apparent from FIG. 1 that the desirable current-on time is 3 ms (i.e., 3 millisecond). On the contrary, when the temperature of the thermal head rises to a sufficiently high temperature, the current-on time can be shorten. For example, when the temperature of the thermal head is at 60 degrees centigrade, the desirable current-on time is 0.5 ms. As described above, the density control circuit detects the temperature of the thermal head by the thermistor (which is provided within the thermal head) and determines the desirable current-on time where the printing density is controlled to become constant.

Meanwhile, the conventional thermal transfer type printers include a bar code printer and a color printer and the like. Recently, such bar code printer is used in several fields, such as the factory automation (FA) field, a distribution industry field and the like. In addition, such color printer is used in the office automation (OA) field and the computer aided design (CAD) field and the like. Due to demands of the above-mentioned fields, highly fine-grained printing and high printing quality are required for the printer.

However, the printing density is maintained constant in the conventional thermal transfer type printer, regardless of kinds of the printing density. Hence, the conventional printer suffers a problem in that it is impossible for an external control device (such as a computer etc.) to vary the printing density in accordance with character patterns. A variable density switch enables the printer to vary the printing density of all printed patterns. Even in a printer having such variable density switch, however, it is impossible to vary the printing density by every character data.

Next, description will be given with respect to a variable density control of the thermal transfer type bar code printer, for example. When a density control condition is adjusted so that vertical bar codes are printed in a desirable printing density, the printing density of horizontal bar codes becomes faint and a clearance gap is formed between adjacent dots. On the contrary, when the density control condition is adjusted so that the horizontal bar codes are printed in a desirable printing density, the printing density of the vertical bar codes becomes too deep and the ink printed on one vertical bar code is flown over to the adjacent vertical bar code so that the two adjacent vertical bar codes are connected together by such flown ink. This causes an error in reading data from the bar codes using a bar code reader.

Incidentally, the horizontal bar codes differ from the vertical bar codes by a reading direction of the bar code reader. More specifically, data of the horizontal bar codes can be read by the bar code reader in a horizontal direction, and data of the vertical bar codes can be read by the bar code reader in a vertical direction.

FIGS. 2A, 2B, 3A and 3B show printed dots of the thermal transfer type bar code printer. More specifically, FIGS. 2A and 2B show horizontal bar codes which are read by the bar code reader in the horizontal direction indicated by an arrow H, and FIGS. 3A and 3B show vertical bar codes which are read by the bar code reader in the vertical direction indicated by an arrow V.

Further more specifically, FIG. 2*a* designates the horizontal bar codes in the case where the current-on time of the head is set relatively short. As shown in FIG. FIG. 2A, the printing density is therefore faint and a distance A is formed between two adjacent dots. This horizontal bar code must be formed in a continuous line, however, the horizontal bar code is actually formed in a dotted line. On the contrary, in the case where the current-on time of the thermal head is set relatively long as shown in FIG. 2B in order to prevent the above phenomenon, sizes of dots become large and the two adjacent dots are connected together so that the horizontal bar code is formed in the continuous line.

On the other hand, FIG. 3A designates vertical bar codes in the case where the current-on time of the thermal head is set relatively long. As shown in FIG. 3A, the printing density of the vertical bar codes becomes deep so that two adjacent vertical bar codes are connected by overflown ink. This phenomenon is called "tailing" phenomenon. In order to prevent such tailing phenomenon from occurring, the current-on time of the thermal head must be set short enough so as to make the sizes of dots small as shown in FIG. 3B.

As described heretofore, it is difficult to print the horizontal and vertical bar codes together on the printing paper and it is also difficult to control the printing densities of both bar codes at a constant printing density in the conventional thermal transfer type printer. Such difficulty of the conventional thermal transfer type printer also occurs in the conventional thermal transfer type color printer, in which the printing density can not be varied in response to the contents of the print data.

SUMMARY OF THE INVENTION

It is therefore the primary object of the invention to provide a thermal transfer type printer in which a constantly high printing quality can be obtained even when the horizontal and vertical bar codes are printed together on the printing paper.

It is another object of the invention to provide a thermal transfer type printer providing means for arbitrarily setting the printing density from an external device in response to the contents of the print data.

In a first aspect of the invention, there is provided a thermal transfer type bar code printer comprising: (a) an input terminal supplied with a select signal for selecting one of a vertical bar code and a horizontal bar code, the select signal being supplied from an external device, the vertical bar code being identical to a bar code which is printed on the printing paper in a direction perpendicular to the carrying direction of the printing paper, the horizontal bar code being identical to a bar code which is printed on the printing paper in the carrying direction of the printing paper; (b) a plurality of memory portions for storing control data for controlling, a power supplied to the thermal head, the control data representing a specific power supply characteristics, the control data stored in a certain memory portion being different from those stored in other memory portions; (c) a power supply selecting portion for selecting one of the memory portions, the memory portion storing the control data which represent a relatively large quantity of power supply being selected when the select signal selects the horizontal bar code, the memory portion storing the control data which represent a relatively small quantity of power supply being selected when the select signal selects the vertical bar code; and (d) a current-on control portion for performing a current-on control on the thermal head based on the control data stored in the memory portion which is selected by the power supply selecting portion.

In a second aspect of the invention, there is provided a thermal transfer type printer comprising: (a) a first memory portion for storing density increment/decrement data supplied from an external device for a while; (b) a second memory portion for storing reference data concerning a reference quantity of power supplied to the thermal head; (c) an operation portion for increasing or decreasing the value of the reference data by a density data value which is obtained from the density increment/decrement data stored in the first memory portion; and (d) current-on control means for controlling a quantity of power supplied to the thermal head based on an operation result of the operation portion.

In a third aspect of the invention, there is provided a thermal transfer type printer comprising: (a) memory means for storing print data corresponding to the desirable dot pattern and first and second current-on time data, each of the first and second current-on time data representing data of specific current-on time characteristics designating a relation between the current-on time and the surrounding temperature of the thermal head, the value of the first current-on time data being set higher than the value of the second current-on time data; (b) temperature detecting means for detecting the surrounding temperature of the thermal head and outputting temperature data corresponding to detected surrounding temperature of the thermal head; and (c) thermal head control means for controlling the temperature of the thermal head by varying the current-on times of the heating cells based on the print data and a control signal, the print data selecting heating cells to be heated, the control signal selecting one of the first and second current-on time data stored in the memory means so that an optimum current-on time is read from the current-on time characteristics corresponding to selected current-on time data based on the temperature data, and the power being supplied so as to heat the heating cells selected by the print data for the optimum current-on time.

In a fourth aspect of the invention, there is provided a thermal transfer type printer comprising: (a) first memory means for storing character data corresponding to the desirable dot pattern and reference current-on time data representing data of reference current-on time characteristics designating a relation between the current-on time and the surrounding temperature of the thermal head; (b) second memory means for storing density data including density command and an increment/decrement value which is arbitrarily set, the reference current-on time data being designated by the density command; (c) temperature detecting means for detecting the surrounding temperature of the thermal head and outputting temperature data corresponding to detected surrounding temperature of the thermal head; and (d) thermal head control means for controlling the temperature of the thermal head by varying the current-on times of the heating cells based on the density data and the temperature data, the character data selecting heating cells to be heated, the reference current-on time being read from the reference current-on time characteristics based on the temperature data and the reference current-on time being increased or decreased based on the increment/decrement value so as to calculate out an optimum current-on time, and the power being supplied so as to heat the heating cells selected by the character data for the optimum current-on time.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 1:
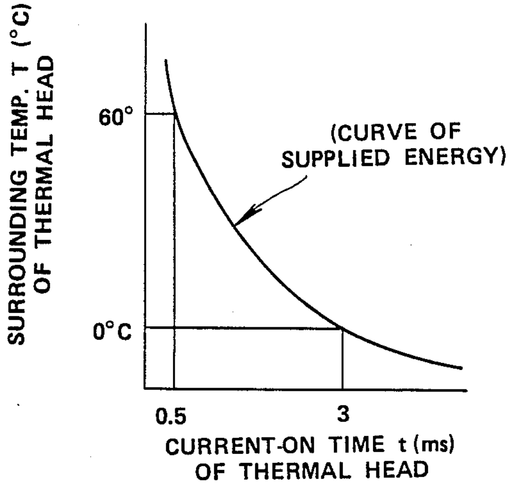
FIG. 1 is a graph showing a curve of supplied energy.
Figures 2A, 2B:
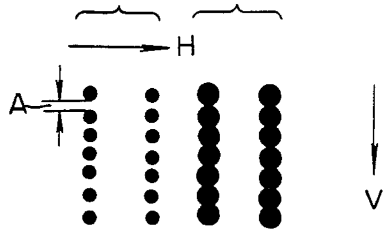
FIGS. 2A and 2B show dot patterns of horizontal bar codes.
Figure 3A:
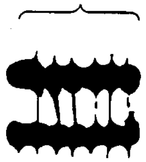
FIGS. 3A and 3B show dot patterns of vertical bar codes.
Figure 3B:
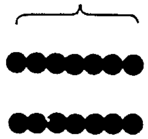

Referring now to the drawings, wherein like reference characters designate like or corresponding parts throughout the several views.

Figure 4:
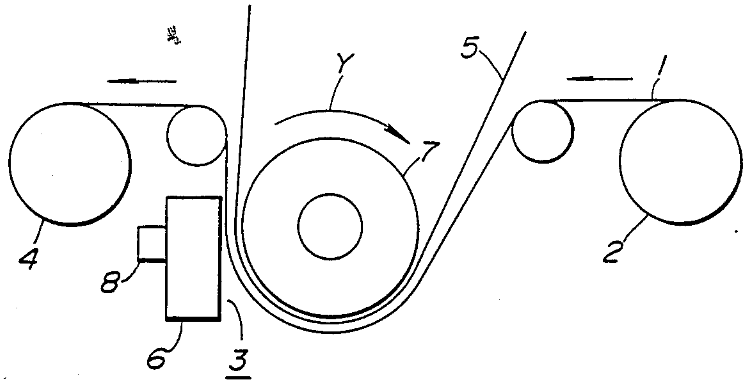
FIG. 4 is a mechanical diagram showing an embodiment of a constitution of a thermal transfer type bar code printer according to the present invention.

FIG. 4 is a mechanical diagram showing an embodiment of a constitution of a thermal transfer type bar code printer according to the present invention. In FIG. 4, 1 designates a transfer ribbon, the upper surface of which is painted by the thermal melting ink. This transfer ribbon 1 is transmitted from a supply reel 2 and is passed through a printing portion 3, and thereafter, the transfer ribbon 1 is taken up by a take-up reel 4. In addition, 5 designates a printing paper, one surface of which is pressed against and touched together with the upper surface of the transfer ribbon 1. This printing paper 5 piled with the transfer ribbon 1 is passed through the printing portion 3. The printing portion 3 consists of a thermal head 6 and a platen roller 7. The thermal head 6 provides heating cells (which will be described later) which are heated by supplying currents thereto. When the printing operation is performed, the thermal head 6 is forced to be pressed against the platen roller 7, so that the transfer ribbon 1 and the printing paper 5 are piled together under the pressure applied between the thermal head 6 and the platen roller 7. In this case, the heated heating cells melt the ink painted on the transfer ribbon 1 and the melted ink is transferred to the printing paper 5. Furthermore, the platen roller 7 revolves by a minute distance in a direction Y, so that the transfer ribbon 1 and the printing paper 5 can advance by every dots. The heating temperature of the thermal head 6 can be measured by a thermistor 8 mounted on the thermal head 6.

Figure 5:
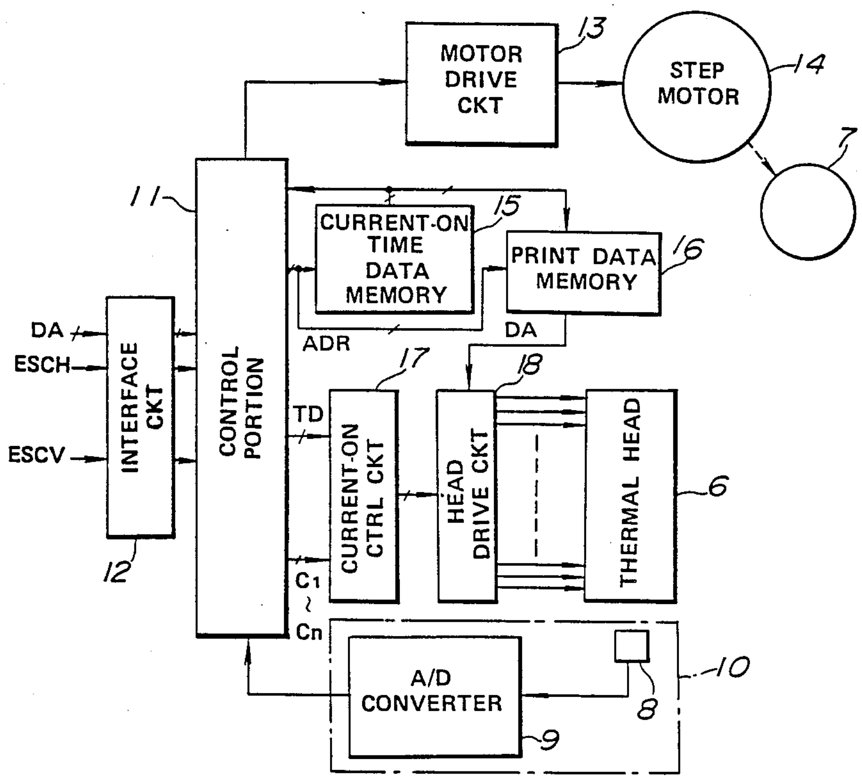
FIG. 5 is a block diagram showing an electric connection of the printer shown in FIG. 4.

Next, FIG. 5 is a block diagram showing an electric connection of the printer shown in FIG. 4. In FIG. 5, 10 designates a temperature detecting circuit which is constituted by an analog-to-digital (A/D) converter 9 and the thermistor 8. The analog output signal of the thermistor 8 is converted into digital data in the A/D converter 9. This digital data are supplied to a control portion 11 as temperature data, the value of which represents the temperature of the thermal head 6. An interface circuit 12 is inserted to transfer several kinds of data between an external computer (not shown) and the control portion 11. Such data include print data DA, a control signal ESCH for printing the horizontal bar codes and a control signal ESCV for printing the vertical bar codes.

Next, the control portion 11 consists of a central processing unit (CPU), a work memory and a program memory (not shown) and the like. This control portion 11 controls several portions within the printer and supplies current-on time data TD to a current-on control circuit 17 in order to determine the current-on time for the thermal head 6. Such current-on time data TD are stored as a table in a current-on time data memory 15 (hereinafter, referred simply as to a memory 15). Hence, the control portion 11 reads optimum current-on time data TD from the memory 15 in accordance with several kinds of required conditions.

Figure 6:
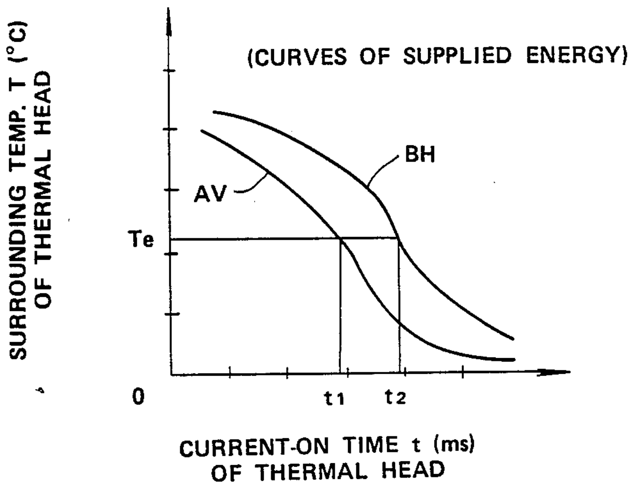
FIG. 6 is a graph showing curves of supplied energy, the data of which are stored in a memory within the circuit shown in FIG. 5.

Next, description will be given with respect to the contents of data stored in the memory 15. FIG. 6 shows curves of supplied energy, the data of which are stored in the memory 15. In FIG. 6, a x-axis represents the current-on time, and a y-axis represents a surrounding temperature of the thermal head 6. Two curves AV and BH are shown in FIG. 6, and the supplied energy on the curve BH is higher than that of the curve AV. The data of these two curves are stored in the memory 15 as numeric value table etc.

More specifically, the curve BH represents the optimum printing density for printing the horizontal bar codes, and the data of such printing density are pre-obtained in an experiment on the current-on time characteristics of the thermal head. Similarly, the curve AV represents the optimum printing density for printing the vertical bar codes. The control portion 11 selects the data of the curve AV when the signal ESCV is supplied thereto. On the other hand, the control portion 11 selects the data of the curve BH when the signal ESCH is supplied thereto.

In FIG. 6, when the surrounding temperature of the thermal head is at a temperature Te, a current-on time $t_1$ is read from the curve AV, and a current-on time $t_2$ is read from the curve BH. The control portion 11 determines the current-on time data TD based on the temperature data from the temperature detecting circuit 10 and selected one of the curves AV and BH. The data stored in the memory 15 are read out based on address data ADR which are renewed by every data read-out timings in the control portion 11. For example, the upper data within the address data ADR are determined by one of the signals ESCH and ESCV, and the lower data within the address data ADR are determined by the temperature data from the temperature detecting circuit 10.

Figure 7:
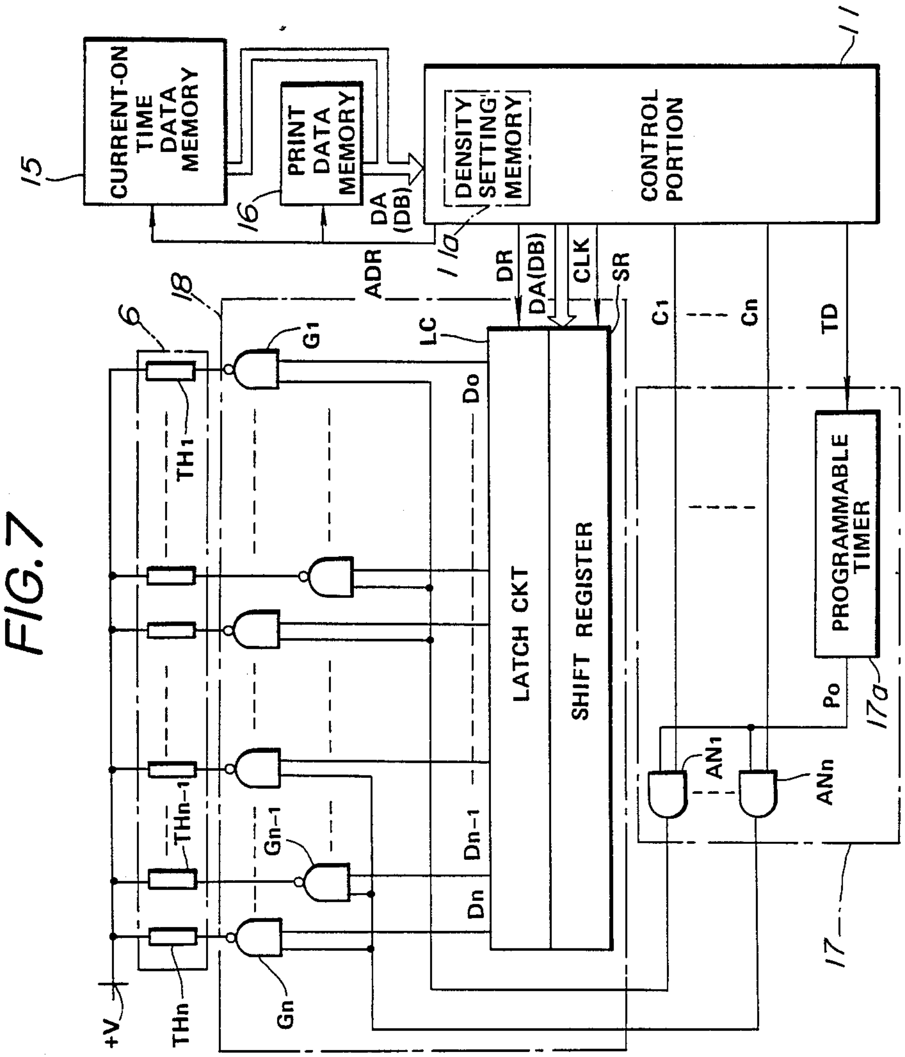
FIG. 7 is a detailed circuit diagram showing a main portion within the circuit shown in FIG. 5.
Figure 8:
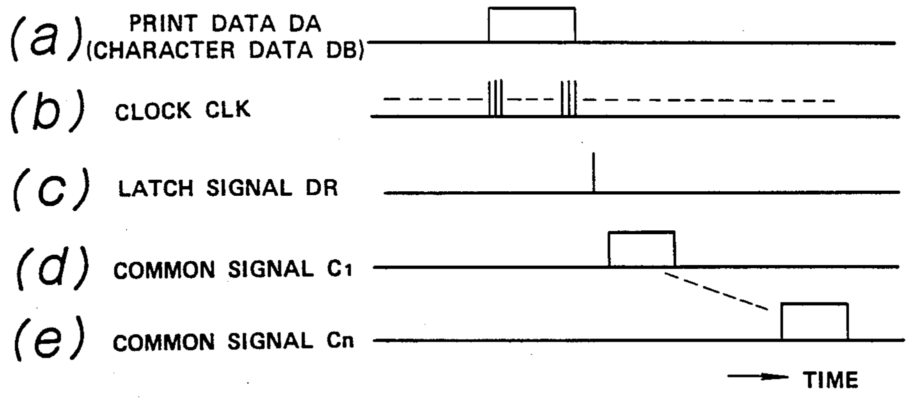
FIGS. 8 and 9 show waveforms for explaining operations of the circuit shown in FIG. 5.

Next, 13 designates a motor drive circuit which drives a step motor 14 so as to revolve the platen roller 7 by a predetermined step distance under the control of the control portion 11. In addition, 16 designates a print data memory which stores dot data (which represent dot patterns of the bar codes) supplied from the external computer (not shown) and the like. The dot data are read out from the print data memory 16 based on the address data ADR supplied from he control portion 11 and such dot data are supplied to a head drive circuit 18. Furthermore, the current-on control circuit 17 supplies the currents to the selected heating cells for a period corresponding to the current-on time data TD. As shown in FIG. 7, this current-on time control circuit 17 consists of a programmable timer 17*a* and AND gates $AN_1$ to $AN_n$. The current-on time data TD are preset in the programmable timer 17*a* by the control portion 11. The one input terminals of the AND gates $AN_1$ to $AN_n$ are connected in common to the output terminal of the programmable timer 17*a*, and common signals $C_1$ to $C_n$ outputted from the control portion 11 are supplied respectively to other input terminals of the AND gates $AN_1$ to $AN_n$. These common signals $C_1$ to $C_n$ have the same constant pulse width, and the leading edge timings of such common signals $C_1$ to $C_n$ are sequentially shifted by a predetermined time as shown in FIGS. 8(*d*) and 8(*e*).

The head drive circuit 18 supplies the currents to heating cells TH1 to THn within the thermal head 6 in correspondence with the dot data supplied from the print data memory 16. This head drive circuit 18 consists of a shift register SR, a latch circuit LC and drive gates $G_1$ to $G_n$ corresponding to the heating cells $TH_1$ to $TH_n$. The dot data DA (i.e., the print data DA) shown in FIG. 8(*a*) are supplied to and stored in the shift register SR based on a clock CLK shown in FIG. 8(*b*). Thereafter, a latch signal DR (shown in FIG. 8(*c*)) is outputted from the control portion 11 at an end timing of storing the dot data DA in the shift register SR, and such latch signal DR is supplied to the latch circuit LC wherein the dot data DA are stored therein. The head drive circuit 18 supplies currents so as to heat the heating cells $TH_1$ to $TH_n$ based on the dot data DA and pulse signals outputted from the AND gates $AN_1$ to $AN_n$ within the current-on control circuit 17. As shown in FIG. 8, the operation of the head drive circuit 18 and the timings of the common signals $C_1$ to $C_n$ are determined such that the common signal $C_1$ is outputted when the dot data DA is latched in the latch circuit LC. Thereafter, the common signals $C_2$ to $C_n$ are sequentially outputted at every data latch timings.

Next, description will be given with respect to printing operations of the present embodiment.

Firstly, when the external computer supplies the dot data DA (or the pattern data DA of the bar codes) and the control signal ESCH to the control portion 11 via the interface circuit 12, the control portion 11 writes the dot data DA into the print data memory 16 and selects the curve BH, the data of which are stored in the current-on time data memory 15. As a result, the head drive circuit 18 writes the dot data DA into the shift register SR and the latch circuit LC sequentially. The levels of the output signals of the latch circuit LC are set to the "1" level or the "0" level in response to the dot data DA. The latch circuit LC supplies the output signals thereof to the input terminals of the gates $G_1$ to $G_n$.

In addition, the current-on time data TD and the common signals $C_1$ to $C_n$ are determined based on the curve BH and the temperature data from the A/D converter 9 in the control portion 11. These current-on time data TD and the common signals $C_1$ to $C_n$ are supplied to the current-on control circuit 17. As a result, logical product operations between an output signal $P_0$ of the programmable timer 17*a* and the common signals $C_1$ to $C_n$ are performed in the AND gates $AN_1$ to $AN_n$ within the current-on control circuit 17. Hence, the AND gates $AN_1$ to $AN_n$ output logical product signals to other input terminals of the gates $G_1$ to $G_n$. Thus, the "0" signal is outputted from the gates supplied with the logical product signals and the output signals of the latch circuit LC, both of which have the "1" level, and the currents are supplied to the corresponding heating cells within the heating cells $TH_1$ and $TH_n$. In this case, the curve BH is selected, whereby a "1" level period (i.e., a high level period) of the pulse signal $P_0$ from the programmable timer 17*a* is set relatively long. Thus, the horizontal bar codes can be printed in the desirable printing density.

On the other hand, in the case where the external computer supplies the dot data DA and the control signal ESCV to the control portion 11, the printing operation thereof is similar to that described heretofore except that the curve AV is selected. Due to the curve AV, the "1" level period of the pulse $P_0$ is set relatively short. Thus, the vertical bar codes can be printed in the desirable printing density.

Figure 9:
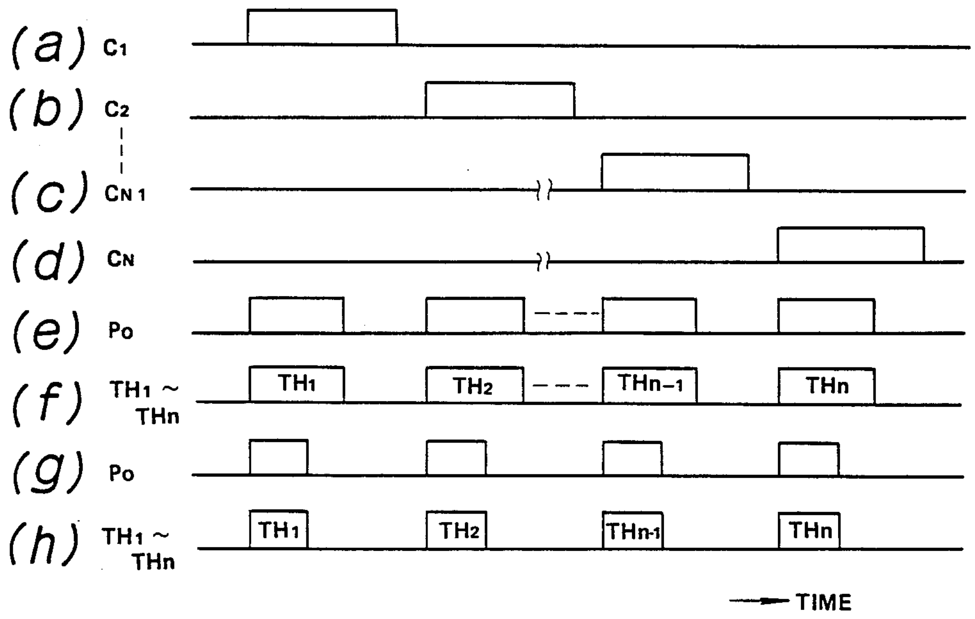

In the meantime, FIG. 9 shows waveforms at several portions of the circuit shown in FIG. 7. More specifically, FIGS. 9(*e*) and 9(*f*) represent the case where the curve BH is selected, and FIGS. 9(*g*) and 9(*h*) represent the case where the curve AV is selected. Further, FIGS. 9(*f*) and 9(*h*) indicate the heating cells to be supplied with the current and to be heated.

As described heretofore, it is possible to print the horizontal and vertical bar codes together with a constant printing density. Such horizontal and vertical bar codes can be printed together on bar code labels which are used for discriminating products in factories. Hence, the mechanism or the electric constitution of the bar code reader which can read both of the horizontal and vertical bar codes is more simple than that of the conventional bar code reader which can read only one of the horizontal and vertical bar codes, because the conventional bar code reader can not read the bar code, the reading direction of which is not identical to the predetermined reading direction.

Next, detailed description will be given with respect to the reason why the constitution of the bar code reader according to the present invention is more simple than that of the conventional bar code reader. For example, when the product is rotated by 90 degrees with respect to the reading direction of the bar code printed on the bar code label which are adhered to the product, the mechanism of the conventional bar code reader must be rotated by 90 degrees in order to read such bar code, or the read data in the x-direction must be exchanged by the read data in the y-direction in the electric circuit of the bar code reader. For this reason, the constitution of the conventional bar code reader must be complicated.

In the present embodiment shown in FIG. 5, the external computer supplies the control signal ESCH for printing the horizontal bar codes and the control signal ESCV for printing the vertical bar codes independently to the control portion 11 via the interface circuit 12. However, it is possible to combine the dot data DA together with the control signals ESCH and ESCV and supply such combined data to the control portion 11. For example, the combined data are constituted by eight bits, and the original dot data DA are assigned to seven bits within the combined data of eight bits. In addition, the original control signals ESCH and ESCV are assigned to remained one bit (hereinafter, referred to as a control bit) within the combined data. In this case, the horizontal bar codes are printed when the value of the control bit is equal to "0", and the vertical bar codes are printed when the value of the control bit is equal to "1".

Figure 11:
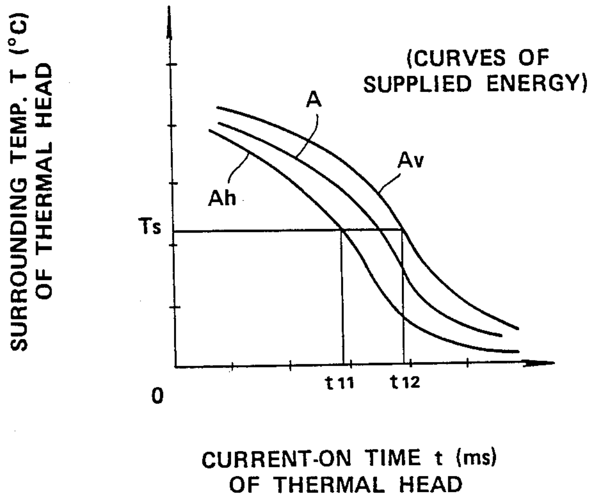
FIG. 11 is a graph showing modified curves of supplied energy, the data of which are stored in a memory within the circuit shown in FIG. 10.
Figure 10:
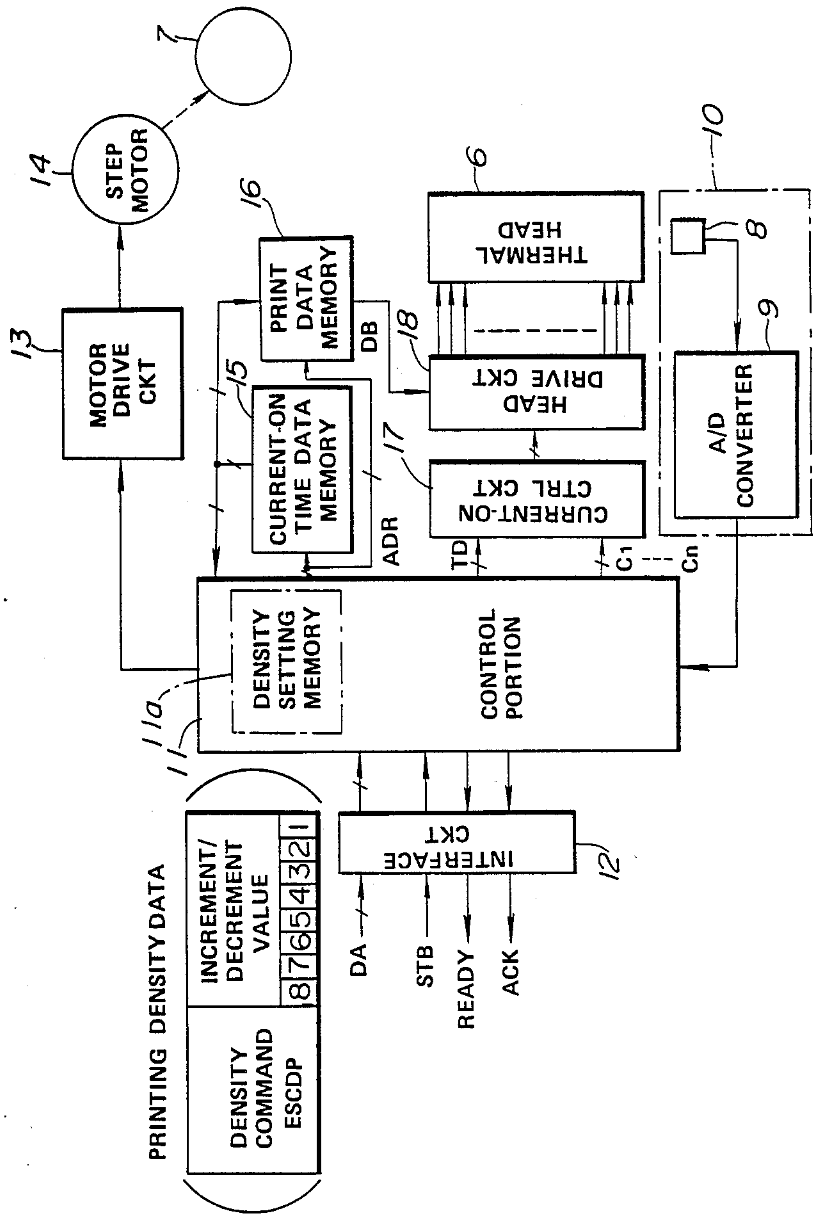
FIG. 10 is a block diagram showing a modified embodiment of the circuit shown in FIG. 5.

Next, description will be given with respect to a modified embodiment of the present invention in conjunction with FIGS. 7, 10 and 11. FIG. 10 shows an electric constitution of the modified embodiment. In FIG. 10, the parts corresponding to those in FIG. 5 will be designated by the same numerals, and the description thereof will be omitted.

In FIG. 10, the external computer supplies the print data DA and a standby signal STB to the control portion 11 via the interface circuit 12. The print data DA include character data DB and printing density data therein. In addition, the printing density data consist of a density command ESCDP and an increment/decrement value. This density command ESCDP represents reference density characteristics (i.e., reference current-on time characteristics) which correspond to a curve A shown in FIG. 11, and the value of the current-on time data is increased or decreased based on said increment/decrement value. This increment/decrement value is represented by data of eight bits. The 7-bit to 1-bit within such data of eight bits represent a value of printing density which indicates a desirable density percentage in a range between 0% to 100%. Further, the 8-bit within such data represents a sign code. More specifically, the sign of such data is turned to a positive sign (+) when the 8-bit value is equal to "0", and the sign of such data is turned to a negative sign (−) when the 8-bit value is equal to "1".

Next, description will be given with respect to the contents of the data stored in the memory 15. Similar to FIG. 6, FIG. 11 shows curves A, Av and Ah of the supplied energy, the data of which are stored in the memory 15. This curve A represents a standard printing density which is pre-obtained in an experiment on the current-on time characteristics of the thermal head. The control portion 11 performs a calculation based on the increment/decrement value of the printing density data. Due to this calculation, the curve A can shift up or down in the y-axis direction in FIG. 11. More specifically, the curve A shifts down to the curve Ah when increment/decrement value of the printing density data represents a negative value, and the curve A shifts up to the curve Av when the increment/decrement value represents a positive value. Therefore, a current-on time $t_{11}$ can be read from the curve Ah and a current-on time $t_{12}$ can be read from the curve Av when the surrounding temperature of the thermal head is equal to a temperature Ts. The control portion 11 determines the value of the current-on time data TD based on the data read from the curve A and the temperature data supplied from the temperature detecting circuit 10. In this case, the current-on time data are read out from the memory 15 based on the address data ADR, the value of which are renewed by every predetermined timings. The address indicated by the address data ADR is determined by the temperature data.

Next, description will be given with respect to the calculation for calculating out the values of the current-on time data TD. For example, in the case where the surrounding temperature of the thermal head is set to 25 degrees centigrade and the increment/decrement value within the printing density data is set to −20%, the current-on time 2 ms can be read from the curve A. By use of this current-on time of 2 ms, the actual current-on time data TD can be obtained from the following formula.

$$\text{(Current-on Time Data) } TD = \text{(Reference Current-on Time)} \times [100 + (+N)]/100$$

In the above formula, N denotes as the increment/decrement value. Therefore, the actual current-on time data TD corresponding to the read current-on time of 2 ms can be calculated as shown in the following formula.

$$\begin{aligned}\text{(Current-on Time Data) } TD &= 2 \times [100 + (-20)]/100 \\ &= 1.6 \text{ (ms)}\end{aligned}$$

Similarly, the control portion 11 can calculate out other current-on time data TD by use of the curve A based on the surrounding temperature of the thermal head and the increment/decrement value within the printing density data.

Meanwhile, the print data memory 16 stores the character data DB included within the print data DA which are supplied from the external compute.. The head drive circuit 18 supplies the power to the heating cells selected in accordance with the character data DB which are supplied from the print data memory 16. The character data DB (shown in FIG. 8(*a*) are supplied to and stored in the shift register SR based on the clock CLK (shown in FIG. 8(*b*)) Thereafter, the character data DB are stored in the latch circuit LC at a timing due to the latch signal DR (shown in FIG. 8(*c*)) which is outputted from the control portion 11 when the storing operation of the data DB is ended in the shift register SR. Hence, the head drive circuit 18 supplies the power to and heats the heating cells which are selected from the heating cells $TH_1$ to $TH_n$ based on the character data DB and the pulse signals outputted from the AND gates $AN_1$ to $AN_n$ within the current-on control circuit 17.

Next, description will be given with respect to the operations of the modified embodiment.

Firstly, the printing density data (the density command of which is set to −20%, for example) within the print data DA are passed through the interface circuit 12 and supplied to the control portion 11 wherein such printing density data are written into a density setting memory 11*a*. Similarly, the character data DB within the print data DA are written into the print data memory 16. This character data DB are subject to a predetermined density control.

More specifically, the current-on time data TD are calculated out by the data read from the curve A based on a value of the printing density data stored within the density setting memory 11*a* and a value of the temperature data (e.g., a digital value indicating a temperature of 25 degrees centigrade) outputted from the temperature detecting circuit 10. As described before, the calculated value of the current-on time data TD is equal to 1.6 ms, for example. As a result, the character data DB within the print data DA are written into the shift register SR and then shifted to the latch circuit LC sequentially, whereby the latch circuit LC supplies signals (each of which has the "0" or "1" level) corresponding to the print data DA to the input terminals of the gates $G_1$ to $G_n$.

Meanwhile, the control portion 11 supplies the calculated current-on time data TD and common signals $C_1$ to $C_n$ to the current-on control circuit 17, wherein the AND gates $AN_1$ to $AN_n$ perform the logical product operations between the output signal $P_0$ from the timer 17*a* and the common signals $C_1$ to $C_n$. Thus, the AND gates $AN_1$ to $AN_n$ output respective logical product signals to the other input terminals of the gates $G_1$ to $G_n$. The "0" signals are supplied to corresponding heating cells from the gates each of which is supplied with the "1" signal and the logical product signal having the "1" level, whereby the corresponding heating cells are given with the power and then heated. In this case, the "1" level period of the output signal $P_0$ of the timer 17*a* is equal to 1.6 ms, which is shorter than the current-on time of the standard printing density. Hence, the sizes of the transferred dots become small and the printing density thereby becomes faint.

On the other hand, in the case where the increment/decrement value of the density data is identified as a positive value, the "1" level period of the output signal $P_0$ of the timer 17*a* is set longer than the standard current-on time. Hence, the sizes of the transferred dots become relatively large and the printing density thereby becomes deep.

In the present embodiment, description has been given with respect to the thermal transfer type printer, however, it is apparent from the above-mentioned description that the present invention can be applied to the thermal transfer type color printer. Furthermore, the present invention can be applied to other thermal transfer type printer such as a thermal transfer type bar code printer.

As described heretofore, the quantity of the power supplied to the thermal head is lowered (e.g., the period for supplying print currents to the thermal head is shorten) when the printer is supplied with the negative density data, the negative value of which is set by the density command outputted from the external device. On the contrary, the quantity of the power supplied to the thermal head is increased when the printer is supplied with the positive density data. Therefore, the conventional printer suffers the tailing phenomenon which appears between two adjacent dots and which is caused by an overheating of the thermal head when the vertical bar codes are printed. However, the present invention can prevent such tailing phenomenon from being caused. In addition, the conventional printer suffers the clearance gap which is formed between two adjacent dots due to the shortage of heating power of the thermal head. According to the present invention, it is possible to vary the size of the transferred dot because the present invention can vary the printing density based on the data. In other words, the present invention can perform a gradient control for the printing density.

This invention may be practiced or embodied in still other ways without departing from the spirit or essential character thereof. For example, the present invention can control the printing density and perform a gradient printing operation such that the sizes of the transferred dots are made small or large by varying the value of the density data. By using such gradient control for the printing density, the present invention can easily perform a multi-color printing and also print intermediate colors other than the primary colors by use of a transfer color ribbon painted with a yellow color (Y), a magenta color (M) and a cyan color (C). The preferred embodiments described herein are therefore illustrative and not restrictive, the scope of the invention being indicated by the appended claims and all variations which come within the meaning of the claims are intended to be embraced therein.

What is claimed is:

1. A thermal transfer type bar code printer for printing on printing paper a desirable printing pattern of arbitrary printing density under the command of control data provided by an external device, and by use of a thermal head while said printing paper is carried in a predetermined carrying direction, said printer comprising:

(a) an input terminal supplied with a select signal for selecting one of a vertical bar code and a horizontal bar code, said select signal being supplied from an external device, said vertical bar code being identical to a bar code which is printed on said printing paper in a direction perpendicular to said carrying direction of said printing paper, said horizontal bar code being identical to a bar code which is printed on said printing paper in said carrying direction of said printing paper;

(b) a plurality of memory portions for storing control data provided by said external device, said control data controlling a power supplied to said thermal head, said control data representing specific power supply characteristics corresponding to the printing of vertical and horizontal bar codes; said control data stored in a certain memory portion being different from those stored in other memory portions;

(c) a power supply selecting portion for selecting one of said memory portions, said memory portion storing said control data which represent a relatively large quantity of power supply being selected when said select signal selects said horizontal bar code, said memory portion storing said control data which represent a relatively small quantity of power supply being selected when said select signal selects said vertical bar code; and (d) a current-on control portion for performing a current-on control said thermal head based on said control data stored in said memory portion which is selected by said power supply selecting portion.

2. A thermal transfer type bar code printer according to claim 1, wherein said printer further comprises means for detecting the temperature of said thermal head, and said memory portion is constituted by a table of said quantity of power supply corresponding to a temperature variation of said thermal head, and said current-on control portion performing said current-on control based on a detected temperature of said thermal head and said control data stored in said memory portion which is selected by said power supply selecting portion.

3. A thermal transfer type bar code printer according to claim 1, wherein data stored in said memory portions are identical to current-on time data.

4. A thermal transfer type printer for printing a desirable printing pattern on a printing paper by use of a thermal head while said printing paper is carried to a predetermined carrying direction, said printer comprising:

(a) a first memory portion for storing density increment/decrement data supplied from an external device for a while;

(b) a second memory portion for storing reference data concerning a reference quantity of power supplied to said thermal head;

(c) an operation portion for increasing or decreasing the value of said reference data by a density data value which is obtained from said density increment/decrement data stored in said first memory portion; and (d) current-on control means for controlling a quantity of power supplied to said thermal head based on an operation result of said operation portion.

5. A thermal transfer type printer according to claim 4, wherein said reference data are identical to current-on time data.

6. A thermal transfer type printer for printing a desirable dot pattern of arbitrary printing density under the command of current-on time data provided by an external device, and by use of at least a transfer ribbon and a thermal head while said printing paper is carried in a predetermined carrying direction, said thermal head providing a plurality of heating cells therein, one surface of said transfer ribbon being painted with thermal melting ink, said thermal head being pressed against said printing paper via said transfer ribbon so that the painted surface of said transfer ribbon is touched to the surface of said printing paper when a printing operation is performed, a power being supplied to said thermal head wherein said heating cells are heated in accordance with said dot pattern and said thermal melting ink is melted and transferred to said printing paper so that said desirable dot pattern is transferred to said printing paper, said thermal transfer type printer comprising:

(a) memory means for storing print data corresponding to said desirable dot pattern and first and second current-on time data provided by said external device, each of said first and second current-on time data representing data of a specific current-on time characteristics designating a relation between the current-on time and the surrounding temperature of said thermal head, the value of said first current-on time data being set higher than the value of said second current-on time data;

(b) temperature detecting means for detecting said surrounding temperature of said thermal head and outputting temperature data corresponding to detected surrounding temperature of said thermal head; and (c) thermal head control means for controlling the temperature of said thermal head by varying said current-on times of said thermal head by varying said current-on times of said heating cells based on said print data and a control signal, said print data selecting heating cells to be heated, said control signal selecting one of said first and second current-on time data stored in said memory means so that an optimum current-on time is read from the current-on time characteristics corresponding to selected current-on time data based on said temperature data, and the power being supplied so as to heat said heating cells selected by said print data for said optimum current-on time.

7. A thermal transfer type printer according to claim 6, wherein said temperature detecting means comprise (a) a thermistor mounted on said thermal head outputting an analog signal corresponding to said surrounding temperature of said thermal head and (b) an analog-to-digital converter for converting said analog signal outputted from said thermistor into said temperature data.

8. A thermal transfer type printer according to claim 6, wherein said thermal head control means comprise (a) control means for outputting said current-on time data based on said temperature data and said control signal, and (b) current-on control means for varying said current-on time of said heating cells based on said current-on time data, and (c) head drive means for supplying the power to said heating cells selected by said print data so that the selected heating cells are heated for a period corresponding to said current-on time designated by said current-on control means.

9. A thermal transfer type printer according to claim 6, wherein said first current-on time data represent the current-on time for printing a horizontal bar code which is printed on said printing paper in said carrying direction of said printing paper and said second current-on time data represent the current-on time for printing a vertical bar code which is printed on said printing paper in a direction perpendicular to said carrying direction of said printing paper.

10. A thermal transfer type printer according to claim 8, wherein said current-on control means comprise (a) a timer for outputting a pulse signal, the pulse width of which is varied based on said current-on time data, and (b) AND gates each of which corresponds to each heating cell, said AND gates outputting pulse signals, the pulse width of which corresponds to said current-on time.

11. A thermal transfer type printer according to claim 10, wherein said head drive means comprise (a) shift register means for once storing and outputting said print data for printing one line on said printing paper by said heating cells, and (b) gates each of which corresponds to each heating cells, said printing data from said shift register means being supplied to one input terminals of said gates and said pulse signals also being supplied to other input terminals of said gates, whereby said heating cells to be heated are selected and heated for said current-on time based on output signals of said gates.

12. A thermal transfer type printer for printing a desirable dot pattern on a printing paper by use of at least a transfer ribbon and a thermal head while said printing paper is carried in a predetermined carrying direction, said thermal head providing a plurality of heating cells therein, one surface of said transfer ribbon being painted with thermal melting ink, said thermal head being pressed against said printing paper via said transfer ribbon so that the painted surface of said transfer ribbon is touched to the surface of said printing paper when a printing operation is performed, a power being supplied to said thermal head wherein said heating cells are heated in accordance with said dot pattern and said thermal melting ink is melted and transferred to said printing paper so that said desirable dot pattern is transferred to said printing paper, said thermal transfer type printer comprising:

(a) first memory means for storing character data corresponding to said desirable dot pattern and reference current-on time data representing data of reference current-on time characteristics designating a relation between the current-on time and the surrounding temperature of said thermal head;

(b) second memory means for storing density data including density command and an increment/decrement value which is arbitrarily set, said reference current-on time data being designated by said density command;

(c) temperature detecting means for detecting said surrounding temperature of said thermal head and outputting temperature data corresponding to detected surrounding temperature of said thermal head; and (d) thermal head control means for controlling the temperature of said thermal head by varying said current-on times of said heating cells based on said density data and said temperature data, said character data selecting heating cells to be heated, said reference current-on time being read from said reference current-on time characteristics based on said temperature data and said reference current-on time being increased or decreased based on said increment/decrement value so as to calculate out an optimum current-on time, and the power being supplied so as to heat said heating cells selected by said character data for said optimum current-on time.

13. A thermal transfer type bar code printer according to claim 2, wherein data stored in said memory portions are identical to current-on time data.

14. A thermal transfer type bar code printer for printing on printing paper, a desirable printing pattern of arbitrary printing density under command of control data provided by an external device, and, by use of a thermal head while said printing paper is carried in a predetermined carrying direction, said printer comprising:

(a) an input terminal supplied with a select signal for selecting one of a vertical bar code and a horizontal bar code, said select signal being supplied from an external device, said vertical bar code being identical to a bar code which is printed on said printing paper in a direction perpendicular to said carrying direction of said printing paper, said horizontal bar code being identical to a bar code which is printed on said printing paper in said carrying directions of said printing paper;

(b) memory means for storing control data provided by said external device, said control data controlling electrical power to be supplied to said thermal head and representing a plurality of pairs of first and second power supply characteristics, each said pair of power supply characteristic corresponding to a particular printing density, and each said first power supply characteristic representing a relatively large quantity of power supply corresponding to printing a horizontal bar code, and each second power supply characteristic representing a relatively small quantity of power supply corresponding to printing a vertical bar code;

(c) a power supply selecting portion for selecting one of said memory portions, said memory portion storing said control data which represent a relatively large quantity of power supply being selected when said select signal selects said data which represent a relatively small quantity of power supply being selected when said select signal selects said vertical bar code; and (d) a current-on control portion for performing a current-on control on said thermal head based on said control data stored in said memory portion which is selected by said power supply selecting portion.

15. A thermal transfer type bar code printer according to claim 14, wherein said printer further comprises means for detecting the temperature of said thermal head and said memory portion is constituted by a table written with data including temperature correction data of said quantity of power supply corresponding to a temperature variation of said thermal head, and a said current-on control based on a detected temperature of said thermal head and said control data stored in said memory portion which is selected by said power supply selecting portion.

* * * * *